July 25, 1944.   A. E. HUGHES ET AL   2,354,318
CALCIUM CARBONATE-ADHESIVE BASE PRODUCT AND
METHOD OF PREPARING COATING THEREFROM
Filed Jan. 8, 1941

INVENTORS
Ausker E. Hughes,
Harold B. Browne and
Howard F. Roderick
BY
Oberlin, Limbach + Day
ATTORNEYS Patented July 25, 1944

2,354,318

UNITED STATES PATENT OFFICE 2,354,318

CALCIUM CARBONATE-ADHESIVE BASE PRODUCT AND METHOD OF PREPARING COATINGS THEREFROM

Ausker E. Hughes, Wyandotte, Harold B. Browne, Trenton, and Howard F. Roderick, Grosse Ile, Mich., assignors, by mesne assignments, to Wyandotte Chemicals Corporation, Wyandotte, Mich., a corporation of Michigan Application January 8, 1941, Serial No. 373,694

9 Claims. (Cl. 106—148)

The present invention relates to the treatment of finely divided precipitated calcium carbonate and the like to improve its properties as a pigment for coated paper, cold water paints, and water inks for the design printing of wall-paper and other similar articles of commerce.

The object of our invention is to produce a low adhesive demand pigment from materials of this nature, which, before treatment, require relatively high proportions of various well-known adhesives.

Calcium carbonate has previously been recognized as a desirable pigment for use in paper coating, cold water paints, water inks for printing wallpaper and allied arts, due primarily to its low cost, high covering power and high degree of whiteness. However, calcium carbonate pigment, especially the higher grades, has been subject to a practical disadvantage in its use in such arts in that it has required a relatively high proportion of adhesive, which latter ingredient is a relatively dear one as compared to the cost of the former. Thus, as high as 25 to 35% adhesive, such as casein, extracted protein from soybean protein and starch, has previously been found necessary in order to produce coatings possessing specified degrees of adhesion when prepared from such pigments.

We have discovered, through the medium of our invention, that the adhesive requirement can be reduced to as low as 12% without materially changing other desirable and essential properties of the pigment. More specifically, our invention makes possible a grade of precipitated calcium carbonate which possesses all of the properties relative to covering power, degree of whiteness, opacity and brightness as exhibited by high grades of this material, and at the same time, its adhesive demand is comparable to that of lower quality products which are totally unsuitable for use in the preparation of such coatings, cold water paints and water inks because they do not possess certain essential properties. The lowering of the adhesive demand of such high grade materials virtually makes possible a new article of commerce, which may be handled, stored and transported in a dry, powdery form, thus resulting in a very substantial cost savings to the consumer. This new article of commerce is, in effect, a base product which the consumer or user may then simply mix with additional adhesive and water solution to the consistency desired for application as the final calcium-carbonate adhesive coating.

The calcium carbonate pigment particularly adapted for use in the practice of our invention is of the high grade type possessing the desired fine particle size and suitably produced by a precipitation process such as more fully described and covered in Roderick U. S. Patent No. 2,164,943, issued July 4, 1939. There are other grades of precipitated or "artificial" calcium carbonate— namely, a coarse grade and a colloidal grade— which are, of course, not acceptable in the paper coating, cold water paint and ink arts, and, hence, are not regarded as within the scope of our invention. The high grade precipitated calcium carbonate used as an ingredient in the process of our invention may be more particularly defined as having a particle size ranging from 1 to 5 microns.

We have discovered a process whereby the adhesive demand of such pigments may be substantially reduced, so that after treatment they require only about one-half the amount of adhesive normally required for imparting given degrees of adhesion to coatings prepared therefrom.

Heretofore, the efforts of solving the problem of reducing the adhesive requirement of calcium carbonates have been directed toward a mechanical treatment of the calcium carbonate alone. Such efforts have involved the pulverizing, grinding and milling of the calcium carbonate in either the wet or dry form. Such procedures are greatly limited when applied to the dry form of milling calcium carbonate, largely because of its tendency toward "making up" or compacting and becoming caked in the mill so that prolonged milling is an impossibility.

The process embodying our invention has eliminated such difficulties incident to the dry milling of calcium carbonate. We have discovered that there is an unusual and critical relationship of the minimum amount of dry adhesive (taken from the group of casein, extracted protein from soybean protein and gum starch), which can be added to the dry calcium carbonate in the milling process. If this minimum amount of adhesive is not present, the above indicated improved results of decreased adhesive demand in the final coating product cannot be achieved. Since "Alpha" is a trade-mark bearing registration #368,826, the description of the product it represents will be employed throughout the specification instead, to wit: extracted protein from soybean.

We have also discovered that the above indicated caking or "making up" of the calcium carbonate in the mill is eliminated, thus permitting the milling process to be continued for any desired period of time, whereby the product is still greater improved in that the adhesive properties of the final coating, for a given amount of adhesive present, are increased.

Casein, in general, serves best and its advantage may be illustrated to those skilled in the art of attrition by the fact that a pebble mill "made up" with dry calcium carbonate compacted on the inner surfaces of the mill and the outer surfaces of the pebbles may be cleaned out by the addition of dry casein and continued milling. Furthermore, the decrease in the adhesive requirement is proportional to the time of milling.

To the accomplishment of the foregoing and related ends, said invention, then consists of the means hereinafter more fully described and particularly pointed out in the claims.

The annexed drawing and the following description set forth in detail one method and one product exemplifying our invention, such disclosed procedure and product constituting, however, but one of various applications of the principle of our invention.

In the practice of our process, the high grade dry precipitated calcium carbonate pigment, having a particle size range of 1 to 5 microns, is intimately mixed with 1 to 2% dry adhesive and fed into a pebble mill and the milling process is carried out until the adhesive requirement is decreased the desired amount. The reduction of the adhesive demand is related to the degree of milling rather than to definite time periods, inasmuch as the efficiency of the milling process is entirely dependent upon the dimensions of the mill, the amount of pebbles in the mill, the size of the pebbles, the ratio of calcium carbonate to pebbles, the speed of the mill and other factors. We have found a satisfactory milling procedure to be as follows: A mill having an inside diameter of 4 ft. and a length of 10 ft. was charged with 3500 lbs. of 1 in. porox balls and 1000 lbs. of calcium carbonate containing 1% dry casein. The mill was set at a speed of 15 R. P. M. Our process is in no way limited to this specific milling procedure. Furthermore, the milling may be carried out in batch process in any type ball mill and continuously in a tube mill.

Figure 1:
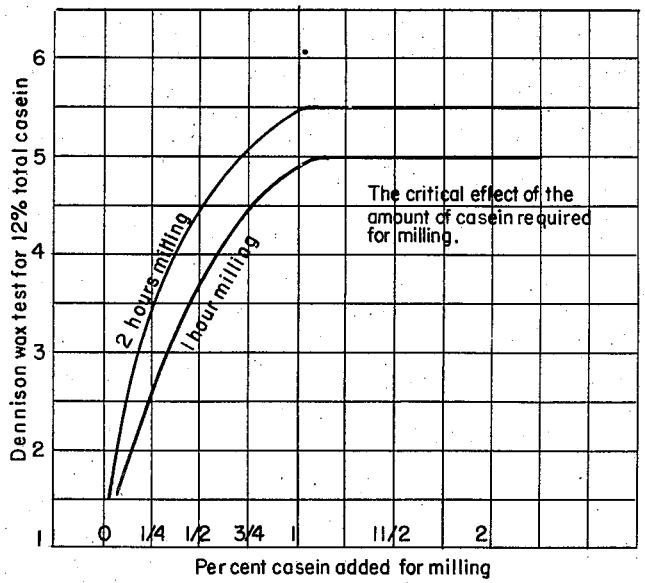
Fig. 1 is a chart showing the amount of casein required for proper milling so that, after milling for 1 to 2 hours, a Dennison wax test of 5 to 6 may be obtained with a casein content of 12% when prepared into a coating and applied to a surface.

We have also discovered that the amount of adhesive required for proper milling is a critical one. Referring to Fig. 1, which is a diagram in which the percent of adhesive—casein in this instance—used in the dry form in the milling process is plotted against the "wax test" or adhesive properties of the coatings prepared from the milled material and a total adhesive content of 12% casein. The relation is given for 1 and 2 hours of milling with increased amounts of casein between 0 and 2%. The maximum effect of the casein on the adhesive demand reduction by milling is realized with 1% casein, and no advantage in adhesive reduction is obtained by milling with amounts greater than 1%. However, as has been illustrated, larger amounts may be incorporated with the dry calcium carbonate so that the milling may be continued over longer periods of time without packing and "making up" in the mill.

Figure 2:
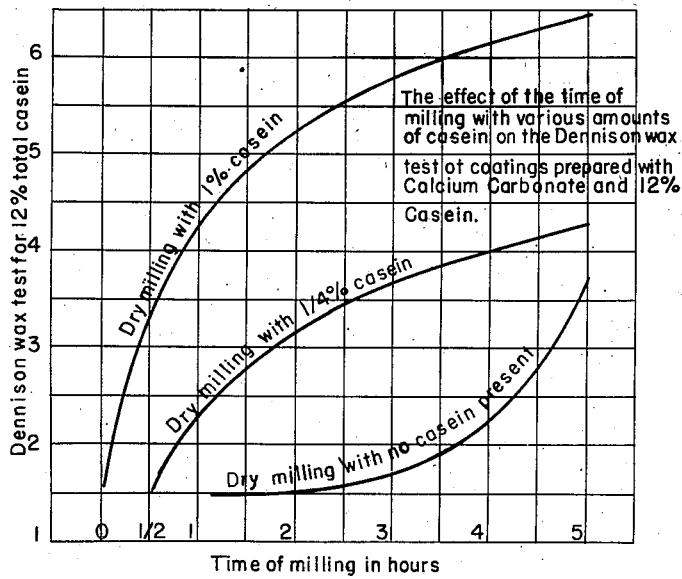
Fig. 2 is a chart showing the effect of the time of milling upon the adhesive demand when milled with various amounts of dry casein.

Fig. 2 shows three curves which give the relation of the time of milling with various percentages of dry casein and the Dennison wax test of coatings prepared from the milled calcium carbonate and 12% casein. The readings or numerical values for this Dennison wax test are determined by the use of a set of standard paper testing waxes (Dennison New Series No. 120A), which waxes, when heated and allowed to cool or set while in contact with the coated paper surface, have varying degrees of adhesion. The waxes are numbered in order of their degree of adhesion and are "picked" or lifted from the coated surface, and the lowest number wax in the numbered series which shows coating material upon its surface after being lifted therefrom determines the "wax test" reading.

Thus a wax test number of 5 has been determined as a proper and acceptable adhesive property test for calcium carbonate coated paper.

Referring to Fig. 2, it will be seen that, after two hours of milling with 1% dry casein, the adhesive demand of the calcium carbonate has been reduced to such a value as to make possible a 5¼ Dennison wax test with coatings carrying only 12% total casein as the adhesive. Moreover, continued milling reduces the value still more, so that, after 5 hours of milling, a 6½ Dennison wax test is possible with the identical coating formula. Before treatment the unmilled material will require approximately 24% casein to produce the standard No. 5 Dennison wax test. Therefore, we show by our invention a reduction in adhesive demand of 50%. The remaining two curves shown on this chart (Fig. 2) are given by way of comparison as steps developed by us in leading up to our process and they are not intended to limit in any way the scope of this invention.

It will be noted that there is a striking difference in the characteristics of the two uppermost curves in Fig. 2 as compared to the lowermost curve. In other words, the two former curves, representing the dry milled mixture of calcium carbonate with dry casein present, are "fast rising" and thus show that there is an immediate and substantial increase in the adhesive properties of the coatings made therefrom; whereas, in the case of the latter curve representing the dry calcium carbonate alone, there is no such appreciable improvement in the adhesive properties of the coatings even after a substantial amount of milling. Thus, it will be seen that in the case of the curves representing the calcium carbonate with casein present, that they have achieved substantially all of their improved adhesive properties at 3 hours milling; whereas, in the case of the lowermost curve, such improvement is barely noticeable after the same amount of milling.

In like manner we have established the fact that the reduction in adhesive demand after milling with dry casein is also apparent with other adhesives, and in particular, alpha protein and the gum starches. In other words, the same improved results of our invention are achieved where two different adhesives, selected from the group of casein, extracted protein from soybean protein and starch are employed as ingredients in one and the same coating. It will be appreciated that our findings which are recorded in Table I substantiate this fact.

TABLE I

*Calcium carbonate milled with dry casein*

| Casein added for milling, per cent | Wax tests |  |  |  |  |  |  |
|---|---|---|---|---|---|---|---|
|  | Time of milling in hours |
|  | 0 | ½ | 1 | 2 | 3 | 4 | 5 | 8 |

CASEIN ADDED TO 12% TOTAL ADHESIVE

| | | | | | | | | |
|---|---|---|---|---|---|---|---|---|
| None | 0-1 | 0-2 | 0-2 | 0-2 | 0-2 | 2.5 | 4.0 | |
| 0.25 | 0-1 | 0-2 | 2.5 | 3.5 | 3.5 | | 4.0 | |
| 1.00 | 0-1 | 3 | 4.5 | 5.5 | 6 | 6 | 6.5 | |
| 2.00 | 0-1 | | 5 | 5 | | | | 8 |

EXTRACTED PROTEIN FROM SOYBEAN PROTEIN ADDED TO 17% TOTAL ADHESIVE

| | | | | | | | |
|---|---|---|---|---|---|---|---|
| 1 | 0-1 | 0-2 | 3.5 | 5 | 5.5 | 5.5 | 6 | |

After milling for two hours with 1% dry casein, only 16% additional adhesive in the form of extracted protein from soybean protein (in water solution), making a total adhesive content of 17%, is required to produce coatings with a wax test of 5. Without treatment, 28% alpha protein would normally be required. Thus, a reduction in adhesive demand, for extracted protein from soybean protein, of 39.3% is readily realized. Other compatible adhesives may be employed with the material milled with dry casein and we conclude that the reduction in adhesive demand will be in proportion to the bonding strength of the adhesive used.

We have also discovered that dry extracted protein from soybean protein is a suitable substance for carrying out the process of our invention, viz., calcium carbonate may be conveniently milled with dry extracted protein from soybean protein and a reduction in the adhesive demand realized. "Alpha protein" is here defined as a soya bean protein extracted by alkaline treatment after removal of the oil from the crushed and pulverized soya bean. The degree of milling required is similar to that required when casein is employed, e. g., continued milling causes a corresponding decrease in the adhesive demand of the calcium carbonate. Larger amounts of extracted protein from soybean protein are required and we have correspondingly ascertained that 2% is the critical amount for incorporating with the calcium carbonate in the dry form for efficient milling. Furthermore, we may add amounts of extracted protein from soybean protein in excess of 2% for the purpose of extending the time of milling far beyond that which would be possible when milling straight calcium carbonate because of its tendency to pack and "make up" within the mill.

Reductions in adhesive requirement obtained by milling with 2% dry extracted protein from soybean protein are apparent when the product thereof is made into a coating by admixture, in water solution, with casein, extracted protein from soybean protein and gum starch, which fact is substantiated by the values given in Table II.

TABLE II

*Calcium carbonate milled with dry alpha protein*

| Alpha protein added for milling, per cent | Wax tests, time of milling in hours |  |  |  |  |  |  |
|---|---|---|---|---|---|---|---|
|  | 0 | ½ | 1 | 2 | 3 | 4 | 5 |

CASEIN ADDED TO 13% TOTAL ADHESIVE

| | | | | | | | |
|---|---|---|---|---|---|---|---|
| 2 | 0.1 | 2.5 | 5 | 5 | 5.5 | 6 | 6.5 |

EXTRACTED PROTEIN FROM SOYBEAN PROTEIN ADDED TO 17% TOTAL ADHESIVE

| | | | | | | | |
|---|---|---|---|---|---|---|---|
| 2 | 0.1 | 4 | | 4 | 5 | 7 | 6 | 7.5 |

We have extended the scope of our invention to include the milling of calcium carbonate with 2% dry gum starch and we have discovered that comparable results are obtained, with respect to reduction of adhesive demand as have been shown in the foregoing and above, with casein and extracted protein from soybean protein. The findings given in Table III bear out this fact in that they show consistent decreases in adhesive demand for increased time periods of milling.

TABLE III

*Calcium carbonate milled with dry gum starch*

| Gum starch added for milling, per cent | Wax tests, time of milling in hours |  |  |  |  |  |  |
|---|---|---|---|---|---|---|---|
|  | 0 | ½ | 1 | 2 | 3 | 4 | 5 |

CASEIN ADDED TO 13% TOTAL ADHESIVE

| | | | | | | | |
|---|---|---|---|---|---|---|---|
| 2 | 0-1 | 2 | 2 | 3 | 5 | 5.5 | 5.5 |

GUM STARCH ADDED TO 17% TOTAL ADHESIVE

| | | | | | | | |
|---|---|---|---|---|---|---|---|
| 2 | 0-1 | 2 | 4 | 4 | 4.5 | 5 | 5 |

The lowering of the adhesive demand is apparent when coatings are prepared from the milled material by incorporating either casein or starch as the adhesive.

Thus, having described in detail the principle of our invention, we cite specific examples for the sake of clarity.

EXAMPLE I

Calcium carbonate containing 1% dry casein was subjected to ball milling for two hours and then made into a coating by the addition of 11% casein (in water solution), making a total adhesive content of 12%. This coating, when brushed onto a sheet of raw stock paper and allowed to dry, showed a wax test of No. 5. There was no noticeable deviation in other essential properties of the coated paper from those prepared from the unmilled material. Without milling, the amount of casein normally required would be 24%. Thus our process results in an adhesive reduction of 50% with respect to casein.

EXAMPLE II

Calcium carbonate containing 1% dry casein was properly milled and made into coatings carrying 17% total adhesive, of which 16% was extracted protein from soybean protein. The finished coated paper prepared from the resulting coating was up to specifications in all of its properties and it exhibited a wax test of 5; whereas similar coatings prepared from unmilled calcium carbonate would require a total extracted protein from soybean protein content of 28% to give a wax test of 5. Accordingly, our process results in a 39.3% reduction of adhesive demand with respect to extracted protein from soybean protein.

EXAMPLE III

Calcium carbonate was milled with 2% dry extracted protein from soybean protein for two hours and made into coatings containing 13% total adhesive, of which 11% was casein. Sheets of coated paper were prepared from the coatings and, in addition to having a wax test of 5, they were satisfactory in other essential properties. Without milling the calcium carbonate with 2% extracted protein from soybean protein, the coatings would have required a casein content of 24%. Thus, our invention results in an adhesive demand reduction of 45.8%.

EXAMPLE IV

Calcium carbonate containing 2% dry extracted protein from soybean protein was dry milled in a pebble mill and subsequently made into coatings containing 17% total extracted protein from soybean protein as the adhesive. Satisfactory coated papers having a wax test of 5 were prepared from these coatings. Since the unmilled calcium carbonate would require 28% extracted protein from soybean protein, our process results in a 39.3% reduction in adhesive demand of the calcium carbonate.

EXAMPLE V

Calcium carbonate containing 2% dry gum starch was subjected to 3 hours of dry milling in a ball mill and then made into coatings carrying 13% total adhesive, of which 11% was casein. Desirable coated papers having a wax test of 5 were prepared from the coatings. Similar coatings prepared from calcium carbonate which was not dry ball milled with 2% dry gum starch required 24% casein. Therefore, our process enables a reduction in adhesive demand of the dry calcium carbonate of 45.8% with respect to casein.

EXAMPLE VI

Dry calcium carbonate containing 2% dry gum starch was ball milled for 4 hours and made into coatings carrying a total of 17% gum starch as the adhesive. The coated papers prepared from the coatings were satisfactory in all essential properties and they had a wax test of 5. Similar coatings prepared from calcium carbonate not subjected to the process of our invention would require 32% gum starch to impart a bonding strength to the coating equivalent to a Dennison wax test of 5. Thus, our invention makes possible a reduction of 47% in the adhesive demand of calcium carbonate with respect to gum starch.

Other modes of applying the principle of our invention may be employed instead of the ones explained, change being made as regards the product and method herein disclosed, provided the step or steps stated by any of the following claims, or the equivalent of such step or steps, be employed.

We, therefore, particularly point out and distinctly claim as our invention:

1. The method of making a base product for the preparation of calcium carbonate-adhesive coatings consisting in dry milling precipitated calcium carbonate having a particle size ranging from 1 to 5 microns and between about 1% and 2% of an adhesive selected from the group consisting of casein and extracted protein from soybean protein, and carrying on the dry milling until the adhesive requirements of the calcium carbonate decreases an appreciable percentage, the mixture achieving all of its improved adhesive properties within about 3 hours milling.

2. The method of making a base product for the preparation of calcium carbonate-adhesive coatings consisting in dry milling precipitated calcium carbonate having a particle size ranging from 1 to 5 microns and about 1% casein and carrying on the dry milling until the adhesive requirements of the calcium carbonate decrease an appreciable percent, the mixture achieving all of its improved adhesive properties within 3 hours milling.

3. The method of making a base product for the preparation of calcium carbonate-adhesive coatings consisting in dry milling precipitated calcium carbonate having a particle size ranging from 1 to 5 microns and about 2% extracted protein from soybean protein and carrying on the dry milling until the adhesive requirements of the calcium carbonate decrease an appreciable percent, the mixture achieving all of its improved adhesive properties within 3 hours milling.

4. The method of making calcium carbonate-adhesive coatings consisting in dry milling precipitated calcium carbonate having a particle size ranging from 1 to 5 microns between about 1% and 2% of adhesive selected from the group of casein and extracted protein from soybean protein and carrying on the dry milling until the adhesive requirements of the calcium carbonate decrease an appreciable percent and then adding additional adhesive and water thereto to form a fluid coating, such additional adhesive being also selected from the same aforesaid group.

5. The method of making calcium carbonate-adhesive coatings consisting in dry milling precipitated calcium carbonate having a particle size ranging from 1 to 5 microns and approximately 1% casein and carrying on the dry milling until the adhesive requirements of the calcium carbonate decrease an appreciable percent and then adding additional adhesive and water thereto to form a fluid coating, such additional adhesive being selected from the group consisting of casein and extracted protein from soybean protein.

6. The method of making calcium carbonate-adhesive coatings consisting in dry milling precipitated calcium carbonate having a particle size ranging from 1 to 5 microns and approximately 2% extracted protein from soybean protein and carrying on the dry milling until the adhesion requirements of the calcium carbonate decrease an appreciable percent and then adding additional adhesive and water thereto to form a fluid coating, such additional adhesive being selected from the group consisting of casein and extracted protein from soybean protein.

7. As a new article of commerce a base product in dry, powdered form, for the preparation of calcium carbonate-adhesive coatings consisting of calcium carbonate intimately mixed with between about 1% and 2% of a member of the group consisting of casein and extracted protein from soybean protein, and having only a fraction of the adhesive requirement of the calcium carbonate alone, prepared by dry milling precipitated calcium carbonate having particle size ranging from 1 to 5 microns with between about 1% and 2% of an adhesive selected from the group consisting of casein and extracted protein from soybean protein, and carrying on the dry milling until the adhesive requirement of the calcium carbonate has decreased an appreciable extent, the mixture achieving all of its improved adhesive properties within about 3 hours milling.

8. As a new article of commerce a base product in dry, powdered form for the preparation of calcium carbonate-adhesive coatings, consisting of calcium carbonate intimately mixed with about 1% of casein and having only a fraction of the adhesive requirements of the calcium carbonate alone, prepared by dry milling precipitated calcium carbonate having a particle size ranging from 1 to 5 microns with about 1% of casein, and carrying on the dry milling until the adhesive requirements of the calcium carbonate decrease an appreciable percent the mixture achieving all of its improved adhesive properties within 3 hours milling.

9. As a new article of commerce a base product in dry, powdered form for the preparation of calcium carbonate-adhesive coatings, consisting of calcium carbonate intimately mixed with about 2% of extracted protein from soybean protein and having only a fraction of the adhesive requirements of the calcium carbonate alone, prepared by dry milling precipitated calcium carbonate having a particle size ranging from 1 to 5 microns with about 2% of extracted protein from soybean protein and carrying on the dry milling until the adhesive requirement of the calcium carbonate has decreased an appreciable extent, the mixture achieving all of its improved adhesive properties within about 3 hours milling.

AUSKER E. HUGHES.
HAROLD B. BROWNE.
HOWARD F. RODERICK.